United States Patent [19]

Numata

[11] 4,110,768
[45] Aug. 29, 1978

[54] AUTOMATIC FILM WIND UP DEVICE FOR A CAMERA

[75] Inventor: Saburo Numata, Urawa, Japan

[73] Assignee: Fuji Photo Optical Co., Ltd., Omiya, Japan

[21] Appl. No.: 725,734

[22] Filed: Sep. 23, 1976

[30] Foreign Application Priority Data

Sep. 23, 1975 [JP] Japan ............................ 50-131143[U]

[51] Int. Cl.² ................................................. G03B 1/18
[52] U.S. Cl. .................................. 354/173; 192/.02 R; 192/150; 318/466; 335/205
[58] Field of Search ............................ 192/.02 R, 150; 354/173, 170, 171; 335/205; 318/466

[56] References Cited
U.S. PATENT DOCUMENTS

| | | | |
|---|---|---|---|
| 3,448,670 | 6/1969 | Suzuki | 354/173 |
| 3,895,389 | 7/1975 | Arai | 354/173 |

Primary Examiner—John Gonzales

[57] ABSTRACT

In an automatic film wind up device including a drive disc driven by an electric motor and a driven disc connected to a film wind up shaft and rotated by the drive disc, the drive and driven discs are provided with a position detecting elements which detects a predetermined relative position of one disc to the other. The position detecting elements are electric non-contact type switch elements comprised of two elements one of which is mounted on the drive disc and the other of which is mounted on the driven disc. Only when the two elements are in alignment with each other, the motor is driven. The drive and driven discs are coupled together by means of a clutch or a click stop device and are disengaged from each other when the driven disc is forced to stop. Upon the stoppage of the driven disc, the detecting elements detects the disengagement of the discs and act to stop the motor.

6 Claims, 1 Drawing Figure

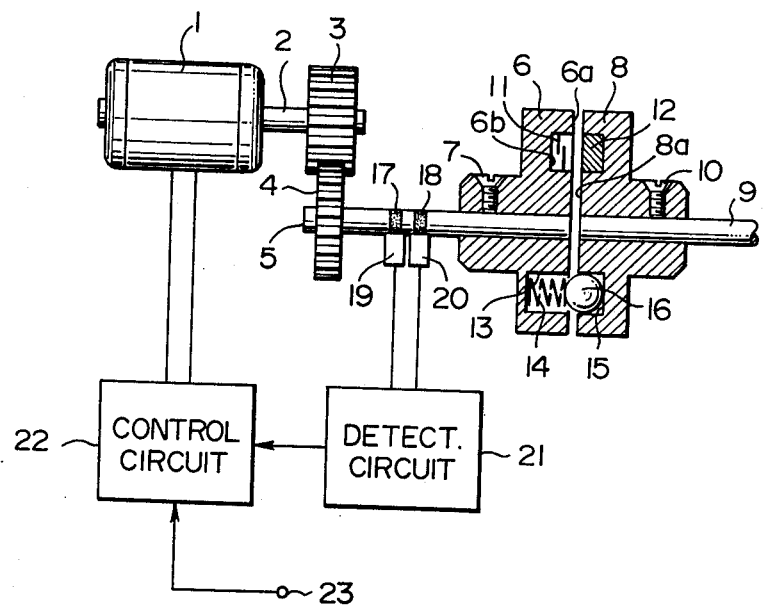

AUTOMATIC FILM WIND UP DEVICE FOR A CAMERA

BACKGROUND OF THE INVENTION

1. Field of the Invention

This invention relates to an automatic film wind up device, and more particularly to an automatic film wind up device which automatically winds up a film in a camera frame by frame using an electric motor.

2. Description of the Prior Art

Automatic film wind up devices which use an electric motor to drive a film wind up shaft to wind up a film in a camera have well been known in the art. The automatic film wind up devices generally use a drive disc connected to a motor, a driven dics connected to a film wind up shaft, and a clutch means to selectively transmit the rotation of the drive disc to the driven disc in synchronization with the feeding of the film. When the clutch is operated to disconnect the driven disc from the drive disc, the electric motor should be stopped. In order to stop the motor in synchronization with the feeding of the film, there has been used a mechanical detecting means which comprises cam means for moving one of the discs in the direction of the axis thereof and means for detecting the axial movement of the disc.

The mechanical detecting means employed in the conventional automatic film wind up devices is, however, disadvantageous in that the structure thereof is complicated and accordingly the manufacturing cost thereof is high and the device is apt to malfunction.

SUMMARY OF THE INVENTION

In view of the above described defects inherent in the conventional automatic film wind up devices, the primary object of the present invention is to provide an improved automatic film wind up device which is of simple construction and accordingly can be manufactured at a low cost.

Another object of the present invention is to provide an automatic film wind up device which accurately operates to wind up a film in a camera frame by frame.

The above objects of the present invention are accomplished by employing a non-contact switch such as a reed switch operated by a magnetic force or a photocoupler as a detecting means in the film wind up mechanism. The non-contact switch is an electric switch comprising two elements one of which is mounted on the drive disc and the other is mounted on the driven disc so that the relative position of the two discs may be detected thereby.

BRIEF DESDRIPTION OF THE DRAWING

A single FIGURE illustrates an embodiment of the present invention, in which the electric motor and a related mechanism including an electric detecting means are shown in a longitudinal partly sectional view.

DESCRIPTION OF THE PREFERRED EMBODIMENTS

Referring to the drawing which shows an embodiment of the automatic film wind up device in accordance with the present invention, an electric motor 1 has a drive motor shaft 2 which is provided with a drive gear 3 fixed thereto. The drive gear 3 is meshed with a driven gear 4 which is fixed to a drive shaft 5. The drive shaft 5 is provided at one end thereof with a drive disc 6 which is fixed thereto by means of a screw 7. A driven disc 8 fixed to a driven shaft 9 by means of a screw 10 is provided in face-to-face relation with said drive disc 6 with its shaft 9 oriented in alignment with said drive shaft 5. In more detail, the drive disc 6 has an end face 6a faced to an end face 8a of the driven disc 8. On the end face 6a of the drive disc 6 is provided a recess 6b in which is installed a reed switch 11. On the end face 8a of the driven disc 8 is provided a permanent magnet 12 at a position where the magnet 12 is faced to said reed switch 11 at an angular position of the disc 8 with respect to the disc 6. Further, on the end face 6a of the drive disc 6 is provided another recess 13 in which is retained a compression spring 14 serving as a click spring, and on the end face 8b of the driven disc 8 is provided a recess 15 in which is retained a click ball 16. The click ball 16 is in alignment with said click spring 14 and is partly buried in said recess 13 on the end face 6a of the drive disc 6 only when said magnet 12 is in alignment with said reed switch 11.

On the drive shaft 5 is provided a pair of contacts 17 and 18 both extending around the shaft 5. The pair of contacts 17 and 18 are electrically connected with said reed switch 11, one contact 17 being connected with one lead contact of the reed switch 11 and the other contact 18 being connected with the other lead contact. A pair of brushes 19 and 20 are in slide contact with the pair of contacts 17 and 18, respectively. The pair of brushes 19 and 20 are connected with a detecting circuit 21 which receives a signal from the brushes 19 and 20 when the two brushes 19 and 20 are electrically disconnected and generates an output signal in response to receipt of the signal. A control circuit 22 is connected with the detecting circuit 21 to receive the output signal therefrom and generate a motor stopping signal upon receipt of the signal from the detecting circuit 21. An input terminal 23 which receives an exposure completion signal is connected with the control circuit 22 to have the same start the motor 1. Thus, the control circuit 22 works to start the motor 1 upon receipt of the exposure completion signal from the input terminal 23 and stop the motor 1 upon receipt of the output signal from the detecting circuit 21.

In operation of the above described embodiment of the present invention, the motor 1 is started to rotate the drive gear 3 and accordingly the drive shaft 5 upon receipt of the exposure completion signal from the input terminal 23. The exposure completion signal is given from a shutter release means or the like as well known in the art when a frame of a film in a camera is exposed to light through a taking lens of the camera to take a photograph thereon. As the drive shaft 5 rotates, the drive disc 6 rotates. Since the drive disc 6 and the driven disc 8 are coupled by means of the ball click comprising the click spring 14 and the click ball 16, the driven disc 8 is rotated together with the drive disc 6 while the click ball 16 is in alignment with the click spring 14. When the wind up of film has been completed, the film is stopped by a well known film wind up stopping means in the camera and accordingly the driven disc 8 is forced to stop thereby. Then, the click ball 16 slips out of the recess 13 of the drive disc 6 and the ball 16 is displaced from the click spring 14. Simultaneously with the displacement of the click ball 16 from the click spring 14, the permanent magnet 12 is displaced from the reed switch 11 on the drive disc 6. Thus, the reed switch 11 is turned off and the pair of contacts 17 and 18 on the drive shaft 5 are electrically disconnected. Accordingly, the detecting circuit 21 receives a signal from the pair of brushes 19 and 20 in contact with the pair of contacts 17 and 18 and generates an output signal to be put into the control circuit 22. The control circuit 22 acts to stop the electric motor 1 upon receipt of the output signal from the detecting circuit 21. Thus, the electric motor 1 is automatically stopped upon completion of the wind up of the film in the camera.

Although in the above described embodiment of the present invention a reed switch 11 and permanent magnet 12 are used as a position detecting means mounted on the discs 6 and 8, these may be replaced by a light emitting diode and a photodetector, i.e. a photocoupler.

I claim:

1. An automatic film wind up device for automatically winding a film loaded in a camera when a frame of the film has been exposed comprising:
    an electric motor which is started upon completion of exposure of one frame of a film in a camera,
    a drive disc connected with said electric motor to be rotated thereby,
    a driven disc connected with a film wind up shaft for rotating the same when driven to rotate, the film wind up shaft being stopped when a predetermined length of film has been wound up thereby, said driven disc having an end face facing to an end face of said drive disc,
    means for coupling said driven disc to said drive disc with a coupling force which is overcome by a force with which said film wind up shaft is stopped,
    a position detecting means comprised of two elements one of which is mounted on the end face of said drive disc and the other of which is mounted on the end face of said driven disc at such positions that the two elements are aligned with each other only when the driven disc is in a predetermined relative position with respect to the drive disc, in said predetermined relative position said driven disc being coupled to said drive disc by means of said coupling means, said position detecting means generating an electric signal when said two elements are moved out of alignment with each other, and
    means connected with said position detecting means and said electric motor for stopping the electric motor upon receipt of said signal from the position detecting means.

2. An automatic film wind up device as defined in claim 1 wherein said position detecting means is comprised of a reed switch provided on the face of the drive disc and a permanent magnet provided on the face of the driven disc.

3. An automatic film wind up device as defined in claim 1 wherein said means for stopping the electric motor is comprised of an electric circuit connected with said motor for giving thereto a signal to stop the motor upon receipt of said electric signal from said position detecting means.

4. An automatic film wind up device as defined in claim 3 wherein said position detecting means is comprised of a reed switch having a pair of lead contacts provided on the face of the drive disc and a magnet provided on the face of the driven disc.

5. An automatic film wind up device as defined in claim 1 wherein said coupling means is a click stop means mounted on the end faces of the discs.

6. An automatic film wind up device as defined in claim 1 wherein said means for stopping the electric motor is connected with an input terminal which receives an exposure completion signal, and starts the electric motor upon receipt of the exposure completion signal therefrom.

* * * * *